United States Patent [19]
Yakubek

[11] 3,779,365
[45] Dec. 18, 1973

[54] ARTICULATED CONVEYOR STRUCTURE

[75] Inventor: Louis P. Yakubek, Perrysburg, Ohio

[73] Assignee: Owens-Illinois, Inc., Toledo, Ohio

[22] Filed: Aug. 10, 1971

[21] Appl. No.: 170,561

[52] U.S. Cl. .............................. 198/131, 198/189
[51] Int. Cl. ............................................. B65g 17/00
[58] Field of Search ................... 198/195, 189, 208, 198/203, 131

[56] References Cited
UNITED STATES PATENTS

| | | | |
|---|---|---|---|
| 2,553,646 | 5/1951 | Field .............................. | 198/189 X |
| 3,237,756 | 5/1966 | Pulver ............................ | 198/195 |
| 3,326,355 | 6/1967 | Phillips .......................... | 198/203 |
| 3,138,236 | 6/1964 | Goodgame ..................... | 198/189 |

FOREIGN PATENTS OR APPLICATIONS

| | | | |
|---|---|---|---|
| 698,000 | 8/1953 | Great Britain ................... | 198/131 |

*Primary Examiner*—Richard E. Aegerter
*Assistant Examiner*—Douglas D. Watts
*Attorney*—J. R. Nelson et al.

[57] ABSTRACT

A conveyor structure for use where accuracy is desired between succeeding portions of the conveyer and, at the same time, wear is to be minimized. The conveyor comprises a plurality of interconnected links. Each link comprises a body having at least two longitudinally spaced openings. A bushing is resiliently mounted in each opening by a relatively resilient but solid plastic molded in situ between the periphery of the bushing and the opening. The links are interconnected by pins extending through the aligned bushings of succeeding links and the pins engage a rotary element such as a sprocket to produce a driving engagement between the rotary element and the conveyor.

6 Claims, 8 Drawing Figures

PATENTED DEC 18 1973

INVENTOR.
LOUIS P. YAKUBEK
BY
J. R. Nelson and E. J. Holler
ATTORNEYS

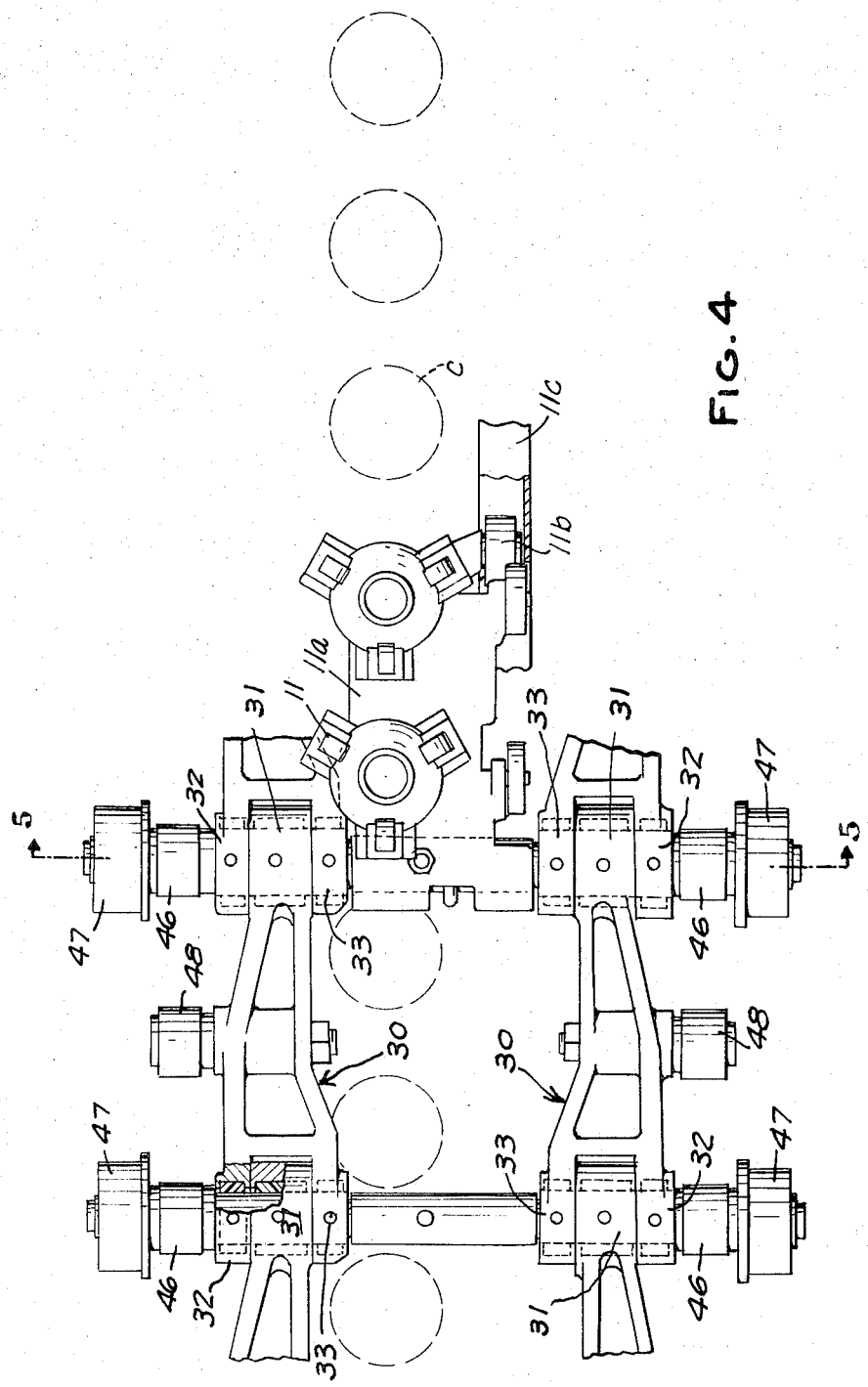

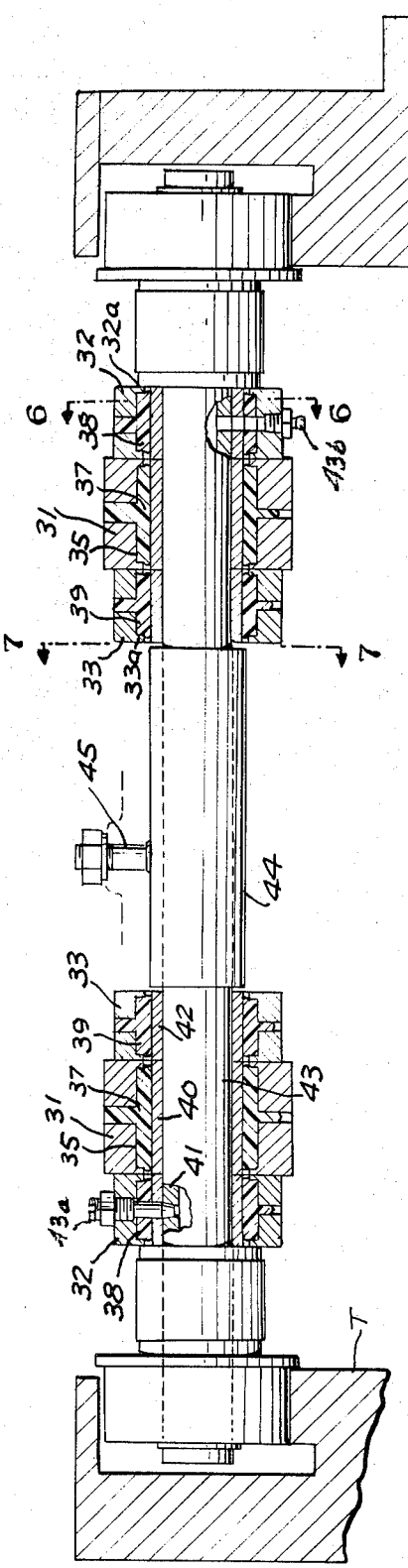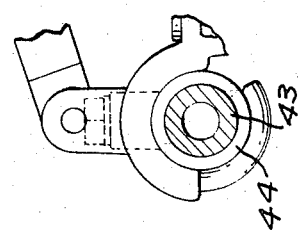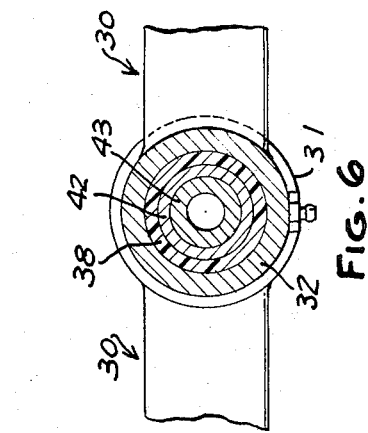

ARTICULATED CONVEYOR STRUCTURE

This invention relates to conveyor structures.

BACKGROUND OF THE INVENTION

In the use of articulated conveyors for making various parts of machinery wherein it is desired to synchronize parts of the machinery such as, for example, glass-making machinery, it has heretofore been necessary to accurately machine interfitting parts. Where such accuracy is used, the conveyor initially has the desired accuracy and resultant accurate alignment with other parts of the machine, but wear occurring in normal operation results in misalignment. Moreover, the machining is expensive and time consuming.

Accordingly, among the objects of the invention are to provide a conveyor construction wherein accurate alignment is achieved at minimal cost, which is particularly adapted for adjustment of the pitch length at selected points along the length thereof, wherein relative resiliency is provided between links to minimize wear and yet at the same time sufficient rigidity is provided to produce the desired accuracy. As a result, wear and misalignment resulting therefrom are minimized.

SUMMARY OF THE INVENTION

The conveyor structure embodying the invention comprises a plurality of interconnected links. Each link comprises a body having at least two longitudinally spaced openings. A bushing is resiliently mounted in each opening by a relatively resilient but solid plastic molded in situ between the periphery of the bushing and the opening. The links are interconnected by pins extending through the aligned bushings of succeeding links and the pins engage a rotary element such as a sprocket to produce driving engagement between the rotary element and the conveyor.

DESCRIPTION OF THE DRAWINGS

FIG. 4 is a fragmentary plan view of a portion of the main conveyor embodying the invention.

FIG. 5 is a fragmentary sectional view taken along the line 5—5 in FIG. 4.

FIG. 6 is a fragmentary sectional view taken along the line 6—6 in FIG. 5.

FIG. 7 is a fragmentary sectional view taken along the line 7—7 in FIG. 5.

DESCRIPTION

Figure 1:
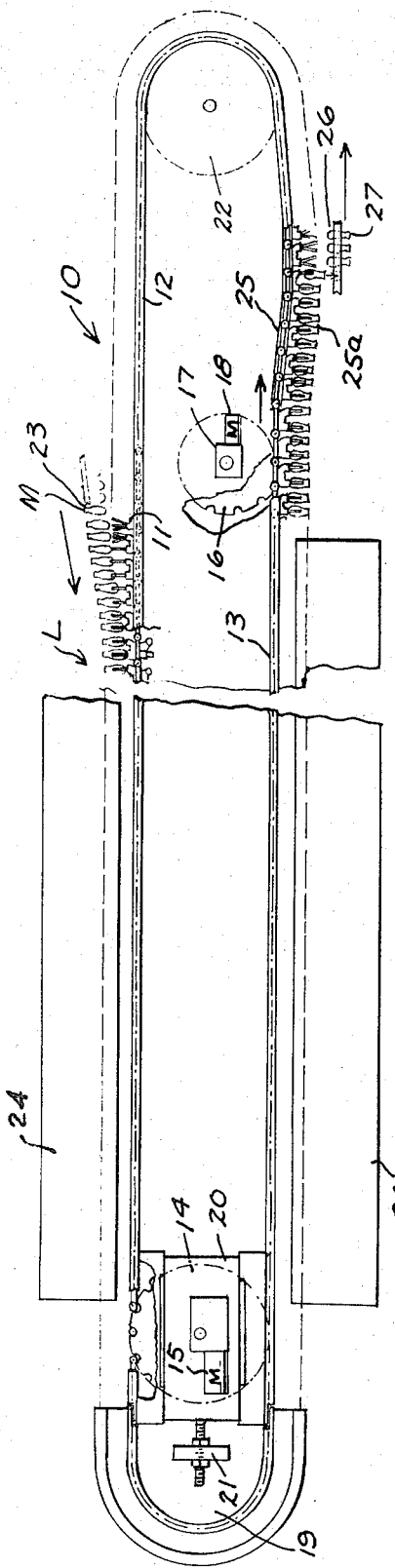
FIG. 1 is a part sectional elevational view of a glass forming machine embodying the invention.

Referring to FIG. 1, the invention is shown as applied to a glass making machine such as a burn-off machine shown in the copending application of Louis P. Yakubek et al., Ser. No. 82,987, filed Oct. 22, 1970, entitled "Glass Making Machinery."

The burn-off machine takes the form of an endless chain conveyor, the chain of which is schematically illustrated at 10. A series of uniformly spaced container chucks 11 are mounted upon and carried by the chain in continuous movement along an endless path having horizontally extending upper and lower runs 12 and 13, respectively. Chain 10 is supported and guided in movement along its endless path by chain tracks mounted upon the machine frame F, not shown in FIG. 1, but described in greater detail below. Chain 10 is driven along its endless path in a counterclockwise direction as viewed in FIG. 1 by a main drive sprocket 14 driven, in turn, by a main drive motor 15, and also by a slave drive sprocket 16 which is drivingly coupled through a slip clutch 17 to a slave drive motor 18.

Main drive sprocket 14 is meshed with both the upper and lower run of chain 10 and supplies the major portion of the driving force for chain 10. The remaining minor portion of the necessary driving force is supplied by slave drive sprocket 16 which is meshed with the lower run of chain 10. Motor 18 is driven at a rate such that slave drive sprocket 16 attempts to move chain 10 at a faster speed than chain 10 is driven by main drive sprocket 14, part of the excess power being applied to tension chain 10 and the remainder absorbed in slip clutch 17. The purpose of slave drive sprocket 16, in addition to that of supplying a portion of the motive power to chain 10, is to maintain a constant tension in that portion of chain 10 on lower run 13. By employing two drives, the magnitude of the chain tension is reduced — there are two drives each effectively pulling a short length of chain rather than a single drive pulling one long length of chain.

Overall tensioning of the chain is accomplished by mounting main drive sprocket 14 and that portion of the chain track defining the left-hand end turn 19 of the chain path upon a sub-frame 20 which is mounted for sliding movement from right to left and vice versa as viewed in FIG. 1 upon the fixed frame F of the burn-off machine. Sub-frame 20 can be shifted horizontally as viewed in FIG. 1 relative to the fixed frame as by a screw jack mechanism schematically illustrated at 21 to establish overall chain tension. Adjustment of sub-frame 20 relative to the fixed frame by the jack mechanism 21 establishes the tension of the major portions of the horizontal upper and lower runs 12 and 13 of chain 10. While it is desired to have an adequate amount of tension in the horizontal runs of the chain, it is desired to have the chain somewhat looser in its passage around right end turn 22 and thus end turn 22 may be similarly mounted upon a sub-frame for horizontal adjustment relative to sub-frame 20.

Containers C are loaded upon chucks 11 of the burn-off machine by the transfer machine such as shown in the co-pending application of John D. Banyas, Ser. No. 825,850, filed May 19, 1969, now U.S. Pat. No. 3,590,982, issued July 6, 1971, partially indicated at 23 in FIG. 1. The containers C, supported from their moil portion M upon transfer machine 23 are lowered into chucks 11 as the transfer machine and chucks move in synchronism to the left along upper run 12 of the burn-off machine. Support of the containers is transferred from transfer machine 23 to the individual chucks 11 at the loading point designated L on FIG. 1. The chucks 11 may include three container gripping fingers which are maintained in an open position until the container C is deposited by transfer machine 23 onto chuck 11, at which time the chuck fingers are closed by a closing mechanism, not shown. Each pair of chucks 11 are mounted on a chuck frame 11a which includes a guide roller 11b on its rearward end that engages a guide track 11c on the conveyor frame for supporting and guiding the chuck frame during movement around the endless path.

As the chucks 11 with their supported containers move to the left along upper run 12 away from loading point L, the containers pass through a preheating zone 24 which applies heat to the container around the region at which the moil portion is integrally joined to the container. This zone is sometimes referred to as a "preheat" zone although its function might be more accurately described as that of maintaining a controlled rate of cooling of the finish region of the container during its transit between loading point L and the location at which the moil is burned off. The containers, at the time they are received by the burn-off machine at loading point L, are at a temperature of between 900° and 1,000° F and at the commencement of the actual burning off of the moil it is desired to have the temperature of the container at between 800° and 900° F. The burners in a preheat zone can be regulated to achieve the desired temperature drop which would otherwise be dependent on such variable factors as ambient plant temperature, line speed, etc.

In order to achieve even exposure of the container around its entire circumference to the action of opposed burners, the container chucks and their supported containers are driven in rotation by an upper spin cycle drive, not shown. As indicated in FIG. 1, as the chucks enter the main heating zone 24a along the lower run 13, they are operatively engaged and again driven in rotation by a second spin cycle mechanism, not shown.

As the chucks 11 with the supported containers pass around end turn 19, the container is moved into an inverted position with the moil portion which is to be burned off now being at the lower end of the container as supported on the chuck so that the moil portion can drop freely from the container upon severance. Main burner section 24a is constructed with a first or burn-off section of opposed burners which extend along the line of travel of the finish portion of the container and direct narrow high-intensity flame jets, in a manner to be described in more detail below, at the line of desired severance. During its passage between the main burners, the container is continuously driven in rotation at a controlled rate. The heat applied by the burners is adjusted so that severance of the moil portion from the container will occur when the container is approximately one half of the way through main burner section 24a. During the latter half of its passage through main burner section 24a, the burners continue to apply heat to the severed edge of the container and this heating action combined with the rotation of the container acts to form a beaded finish 25a on the container.

After the containers pass beyond main burner section 24a, chain 10 and the supported chucks pass along a downwardly inclined portion 25 of the chain path to lower the inverted containers partially into container receiving pockets 26 of a schematically illustrated pocket conveyor 27 driven in synchronism with chucks 11 of the burn-off machine. Chucks 11 are constructed, in a manner to be described in more detail below, so that during their passage along inclined section 25, the containers are maintained in a vertical position for free entry into pockets 26. A chuck opening mechanism causes the chucks to open at the lower end of inclined path section 25 to release the container to permit it to freely drop the remaining distance into the aligned pocket 26 of conveyor 27.

Referring to FIGS. 4-6, chain 10 includes a plurality of pairs of transversely spaced rigid links designated generally 30, each formed with an integral single hub 31 at one end and a pair of transversely spaced hubs 32, 33 at its opposite end, the spacing between hubs 32 and 33 being dimensioned to slidably receive a hub 31. Links 30 on the right and left-hand sides of the chain as viewed in FIG. 4 are identical, the links 30 on the right-hand side of the chain being inverted with respect to the links on the opposite side of the chain. Thus, the hubs 33 are always disposed inwardly of the single hubs 31, while the hubs 32 are always located outboard of the single hub 31.

Figure 2:
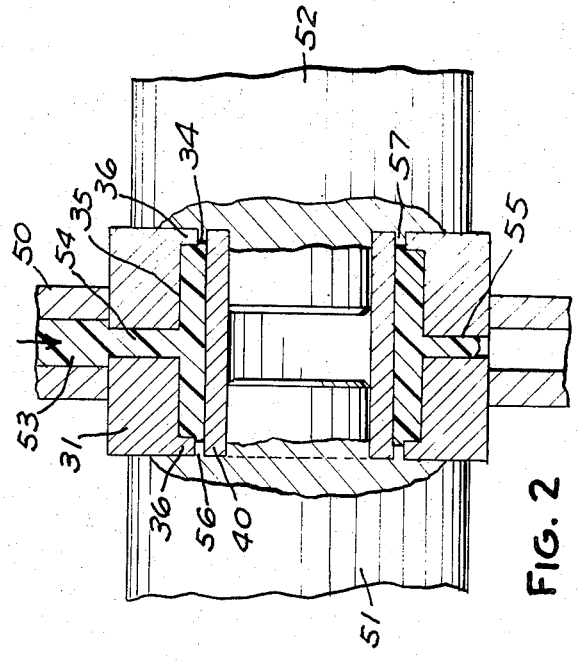
FIG. 2 is a part sectional view showing an apparatus for making the invention, taken along the line 2—2 in FIG. 8.

Referring to FIGS. 2 and 5, hub 31 is provided with a bore 34 which has an annular recess 35 defined by spaced radial flanges 36. Hubs 32, 33 are coaxially bored and have spaced flanges 32a, 33a in a similar fashion. Sleeves or bushings 40, 41, 42 are accurately positioned in hubs 31, 32, 33, respectively. Bodies or fillers 37, 38, 39 of relatively resilient, rigid plastic material are cast in situ in the respective annular recesses, as presently described. Successive links are coupled to each other by a hollow link pin 43 which passes through the bushings 41, 42 of the spaced hubs 32, 33 and through bushing 40 of the single hub 31. A set screw 43a is threaded in each hub 32, 33, respectively, and extends through the respective bearings 41, 42 to lock the hubs 32, 33 and bearings 41, 42 to the pin 43. Oil fitments 43b are also provided for each hub to provide lubrication.

A tubular sleeve 44 is mounted for free rotation and a small degree of limited axial movement on pin 43 between the inner link hubs 33. A threaded stud 45 is fixedly secured to and projects radially outwardly from sleeve 44.

Link pin 43 projects axially outwardly beyond the outer hubs 32 of the links to rotatably support a pair of drive rollers 46 and a pair of support rollers 47 at locations outboard of links 30.

Referring to FIG. 4, an intermediate drive roller 48 is rotatably mounted on each link 30 midway between each pair of pin supported drive rollers 46.

The endless chain 10 is supported and guided in movement by its support rollers 47 which ride on track sections T mounted on the fixed frame F of the machine. Because of the extreme temperature differences between periods of operation and non-operation, the machine frame F and tracks are constructed in a plurality of individual sections with thermal joints.

The chuck assemblies of the machine are carried by chain 10 within the space between links 30 and adjacent link pins 43. This requires link 30 to be of fairly substantial length and the center-to-center distance between successive link pins 43 to approximately 10 inches. While the links 30 are traveling along the horizontal portions of their path, during normal operation of the machine, the links move at constant velocity. During their transit around the curved end turns, the links move along a curved path and hence are subjected during their passage around the end turns to a fairly substantial centripetal acceleration, the magnitude of which is dependent upon the chain velocity and the radius of curvature of the end section. This acceleration can be reduced by making the radius of curvature of the end turn larger, however, from the standpoint of manufacturing economy, there are practical limits to this approach.

In a system where links of substantial length, such as the links 30 of the present machine, should the links pass directly from a straight track section to a curved section or relatively small radius, a whipping or chattering of the links may occur as they pass the transition point because one end of the link is suddenly subjected to a centripetal acceleration of substantial magnitude, while the trailing end of the link is still on a straight section of the path and not subject to this acceleration. Particularly where the links, as will be described below, are carrying a chuck assembly of fairly substantial mass compared to that of the links, this sudden whipping or chattering is undesirable because it is a periodic type of vibration which can approach resonance at certain critical chain speeds.

Figure 8:
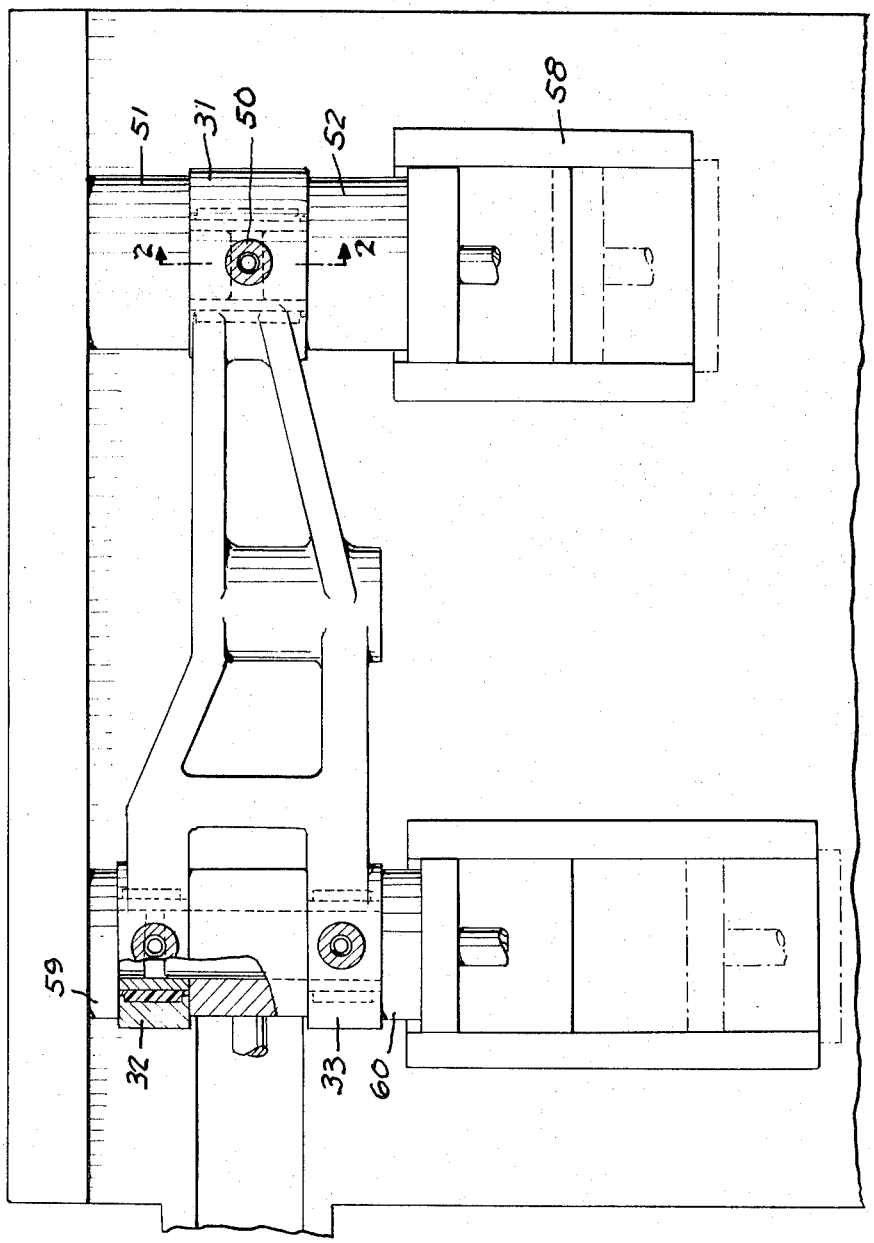
FIG. 8 is a part sectional plan view of an apparatus for making the invention.

Referring to FIGS. 2 and 8, each body or filler 37, 38, 39 is cast in situ by an apparatus as shown. Each link 30 is first formed by machining or casting with the bores of the hubs 31, 32, 33 roughly formed to proper dimension and to general axial and longitudinal alignment. Successive links 30 are then positioned in the apparatus shown in which the bodies or fillers are cast in situ with the bearings 40, 41, 42 in position so that the bearings 40, 41, 42 are axially aligned in accurate relationship and the longitudinal distance between the bearings is accurately controlled.

Referring to FIG. 2, the apparatus for forming the filler 37 and positioning sleeve 40 in hub 31 comprises an outer support 50 which surrounds the hub, in this instance hub 31, die members 51, 52 which engage hub 31 and sleeve 40 and hold the sleeve 40 in predetermined accurate spaced relation to hub 31. Plastic material is then injected through passage 53 in support 50 into an aligned radial passage 54 in hub 31. The plastic flows into cavity or recess 35 and fills the cavity. To insure proper filling a radial overflow passage 55 is provided in hub 31. Die members 51, 52 include integral axial extensions 56, 57 which prevent flow of plastic axially. Die member 52 is movable into and out of position by a piston motor 58.

Simultaneously, as shown in FIG. 8, the apparatus includes die members 59, 60 which engage the hubs 31, 32, 33 to form the mold for holding the sleeves 41, 42 in accurate aligned relation with a previously aligned sleeve 40 and holding the sleeves in accurate longitudinally aligned relation with the sleeve 41 in the other end of the hub. Plastic material injected in the manner of FIG. 2 fixes the sleeves in the accurate aligned relations in which they are held by the apparatus.

Suitable plastic materials which can be used to provide the desired resiliency and rigidity comprise polyurethane.

The bearings 37, 38, 39 molded in situ accurately align the links and produce an accurate conveyor. The bearings provide resiliency at points of increased tension thereby minimizing wear.

It can thus be seen that there has been provided a conveyor structure wherein accurate alignment is reached at minimum cost.

Figure 3:
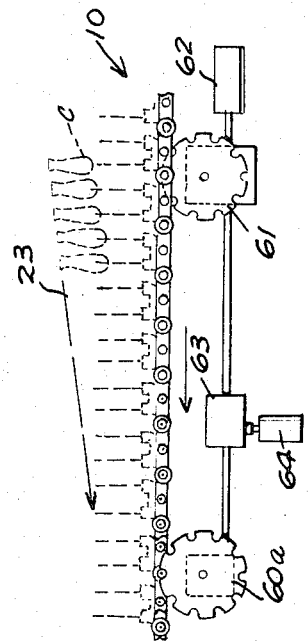
FIG. 3 is a part sectional, partly diagrammatic view on an enlarged scale of a portion of the conveyor shown in FIG. 1.

The invention has particular utility when utilized in connection with a construction for maintaining predetermined pitch length within certain portions of a conveyor such as that disclosed in the copending application of Louis P. Yakubek, Ser. No. 6,895, filed Jan. 29, 1970, entitled "Chain Driven Machinery." Referring to FIG. 3, in such a structure, there is provided adjacent the delivery conveyor 23 and along the receiving conveyor 10 a structure that includes sprockets 60a, 61 which engage longitudinally spaced portions of the conveyor 10 and are driven in synchronism by a motor 62 through phase changing differential 63. By such an arrangement, the portion of the conveyor between sprockets 60a, 61 is maintained at a predetermined overall length thereby maintaining a predetermined pitch length between successive links. This permits the accurate synchronization of the work holders on the chain 10 with the work being delivered by the chain 23. By momentarily rotating one of the sprockets 60a relative to the other sprocket 61, this length can be changed. This is achieved by momentary energization of the motor 64 which drives the phase shifting differential in a manner well known in the art. The provision of the relatively rigid but resilient fillers in the conveyor of the present invention makes the conveyor particularly adaptable for use with such a structure for adjusting the pitch length at predetermined areas along the conveyor.

I claim:
1. Container handling apparatus comprising
a conveyor frame,
spaced opposed channel track means mounted on said frame to define an endless path having vertically aligned horizontal upper and lower runs joined at their opposed ends by curved end turns,
an endless chain comprising a plurality of pairs of transversely spaced elongate rigid links,
transversely extending link pins in said chain pivotally interconnecting the pairs of links to each other in head-to-tail relationship with said pins projecting outwardly beyond said links,
support roller means rotatably mounted on the outer ends of each link pin and respectively received in said opposed track means to support and guide said chain in movement along the endless path defined by said track means,
a sleeve on each said link pin between said pairs of links,
a plurality of container supporting chuck assemblies each comprising a chuck frame releasably clamped at its forward end to one of said sleeves,
guide roller means on the rearward end of said chuck frame,
guide track means on said conveyor frame engaged with said guide roller for supporting and guiding said chuck frame during movement around said endless path,
first drive roll means on each said link pin means between each support roller means and the adjacent link,
second drive roll means on each link midway between the adjacent link pins,
drive means on said conveyor frame engageable with said first and second drive roll means for driving said chain along said endless path,
a bushing in the ends of at least some of said links,
and a filler of relatively resilient material molded in situ about each said bushing,
one of said link pins extending through said bushings.
2. The combination set forth in claim 1 wherein each said link comprises at least two openings at one end and another opening at the other end, each said opening having a bushing supported therein by the filler of resilient material as heretofore defined, the end with the single opening extending between and aligned with the end of the succeeding link with two openings, said pin extending through said three aligned openings.

3. The combination set forth in claim 2 wherein said resilient material comprises polyurethane.

4. The combination set forth in claim 2 wherein said bushings in said openings at one end are rotatably fixed with respect to said one end.

5. The combination set forth in claim 2 including means for lubricating said bushings.

6. The combination set forth in claim 2 including means for varying the pitch length of a predetermined portion of the conveyor at one area along the path of movement of the conveyor.

* * * * *